United States Patent [19]

Dang

[11] Patent Number: 5,610,882
[45] Date of Patent: Mar. 11, 1997

[54] EXTENDABLE DATA STORAGE LIBRARY EMPLOYING DOUBLE GRIPPER PICKER MECHANISM

[75] Inventor: Chi H. Dang, Tucson, Ariz.

[73] Assignee: International Business Machines Corporation, Armonk, N.Y.

[21] Appl. No.: 484,689

[22] Filed: Jun. 7, 1995

Related U.S. Application Data

[63] Continuation of Ser. No. 148,135, Nov. 3, 1993, abandoned.

[51] Int. Cl.⁶ .............................. G11B 17/22; G11B 15/68
[52] U.S. Cl. .................................................. 369/36; 360/92
[58] Field of Search ................................. 369/34, 36, 38, 369/39, 178, 191–194; 360/92, 98.04; 414/280, 278, 281

[56] References Cited

U.S. PATENT DOCUMENTS

| | | | |
|---|---|---|---|
| 4,731,682 | 3/1988 | Nishiyama et al. | 360/92 |
| 4,802,035 | 1/1989 | Ohtsuka | 360/92 |
| 5,429,470 | 7/1995 | Nicol et al. | 360/92 |
| 5,481,514 | 1/1996 | Yamasaki et al. | 369/36 |

FOREIGN PATENT DOCUMENTS

| | | | |
|---|---|---|---|
| 0249314 | 12/1987 | European Pat. Off. | 360/92 |
| 2210818 | 9/1973 | Germany . | |
| 3816398 | 11/1989 | Germany | 360/92 |
| 4017633 | 12/1990 | Germany | 360/92 |
| 61-71450 | 4/1986 | Japan | 360/92 |
| 63-1602 | 1/1988 | Japan . | |
| 0146162 | 6/1989 | Japan | 369/191 |
| 0205755 | 8/1989 | Japan | 360/92 |
| 0009058 | 1/1990 | Japan | 369/178 |
| 4216361 | 8/1992 | Japan | 360/92 |

*Primary Examiner*—Robert S. Tupper
*Assistant Examiner*—Brian E. Miller
*Attorney, Agent, or Firm*—Baker, Maxham, Jester & Meador

[57] ABSTRACT

A data storage library includes a plurality of storage cell magazines containing storage cells for holding storage media cartridges therein. A double gripper picker mechanism is positioned for accessing and transporting the storage media cartridges between at least two adjacent storage cell magazines. The picker mechanism may be a pass through double gripper picker with cartridge sliding motion. The picker grippers are configured for releasably gripping and supporting the storage media cartridges during transport between the storage cells. For increased efficiency, the picker mechanism can be positioned between opposing pairs of storage cell magazines. Additionally, plural picker mechanisms can be positioned between opposing sets of storage cell magazines having three adjacent storage cell magazines each. The three adjacent storage cell magazines include a central magazine and a pair of lateral magazines on opposing first and second sides of the central magazine. Each picker mechanism is positioned to access a pair of central magazines and a pair of lateral magazines on selected sides of the central magazines. The picker mechanisms are arranged so that each side is accessed in alternating fashion.

30 Claims, 4 Drawing Sheets

5,610,882

EXTENDABLE DATA STORAGE LIBRARY EMPLOYING DOUBLE GRIPPER PICKER MECHANISM

This application is a continuation of application Ser. No. 08/148,135, filed Nov. 3, 1993, now abandoned.

BACKGROUND OF THE INVENTION

The present invention relates to automated data storage libraries for storing and retrieving cartridges with data storage media therein, for use by data processing apparatus having access to such libraries.

Automated data storage libraries provide a data storage environment in which large quantities of data are distributed between a plurality of discrete data storage elements, such as magnetic tape or optical disk cartridges, which are placed in addressable storage cell locations arranged in one or more storage cell banks. The storage elements are accessed using positionable cartridge picker mechanisms which may include one or more selectively activatable cartridge grippers.

In order to transport a data storage element between storage cell locations, one of which may contain a data read/write unit in communication with a host data processing system, a picker mechanism is first positioned at a source storage cell containing a data storage element to be retrieved. A gripper is activated to engage the storage element and retract it from the storage cell. The picker mechanism is then positioned at a destination cell and the gripper is again activated to insert the storage element in the storage cell and release it.

Data storage libraries have been proposed in which pickers are used to access columns of cartridge magazines from either side. That arrangement has the capability to provide high performance provided the cartridge magazine columns are arranged in rows on either side of each picker. In addition, a transverse mechanism must be added to allow the picker to serve more than one column of cartridge magazines. Transverse mechanisms are typically slow and in some cases unreliable. To maximize cost effectiveness, the transverse mechanism must span more than two cartridge magazine columns. Consequently, performance is compromised.

Accordingly, an evident need exists for an automated data storage library having multiple gripper picker capability but without the attendant disadvantages of transverse mechanisms. What is required is a system of reduced complexity and cost in which data storage and retrieval times are effectively minimized.

SUMMARY OF THE INVENTION

In accordance with the foregoing objectives, an automated data storage library of unique design is provided. The data storage library includes a plurality of storage cell magazines containing storage cells for holding storage media cartridges therein. A double gripper picker mechanism is positioned for accessing and transporting the storage media cartridges between at least two adjacent storage cell magazines. The picker mechanism may be a pass through double gripper picker with cartridge sliding motion. The picker grippers are configured for releasably gripping and supporting the storage media cartridges during transport between the storage cells. For increased efficiency, the picker mechanism can be positioned between opposing pairs of storage cell magazines. Additionally, plural picker mechanisms can be positioned between opposing sets of storage cell magazines having three adjacent storage cell magazines each. The three adjacent storage cell magazines include a central magazine and a pair of lateral magazines on opposing first and second sides of the central magazine. Each picker mechanism is positioned to access a pair of central magazines and a pair of lateral magazines on selected sides of the central magazines. The picker mechanisms are arranged so that each side is accessed in alternating fashion.

BRIEF DESCRIPTION OF THE DRAWING

The objects, features and advantages of the invention will be more easily understood when considered in light of the following detailed description, together with the accompanying drawing figures, in which.

DETAILED DESCRIPTION OF THE PREFERRED EMBODIMENTS

Figure 1:
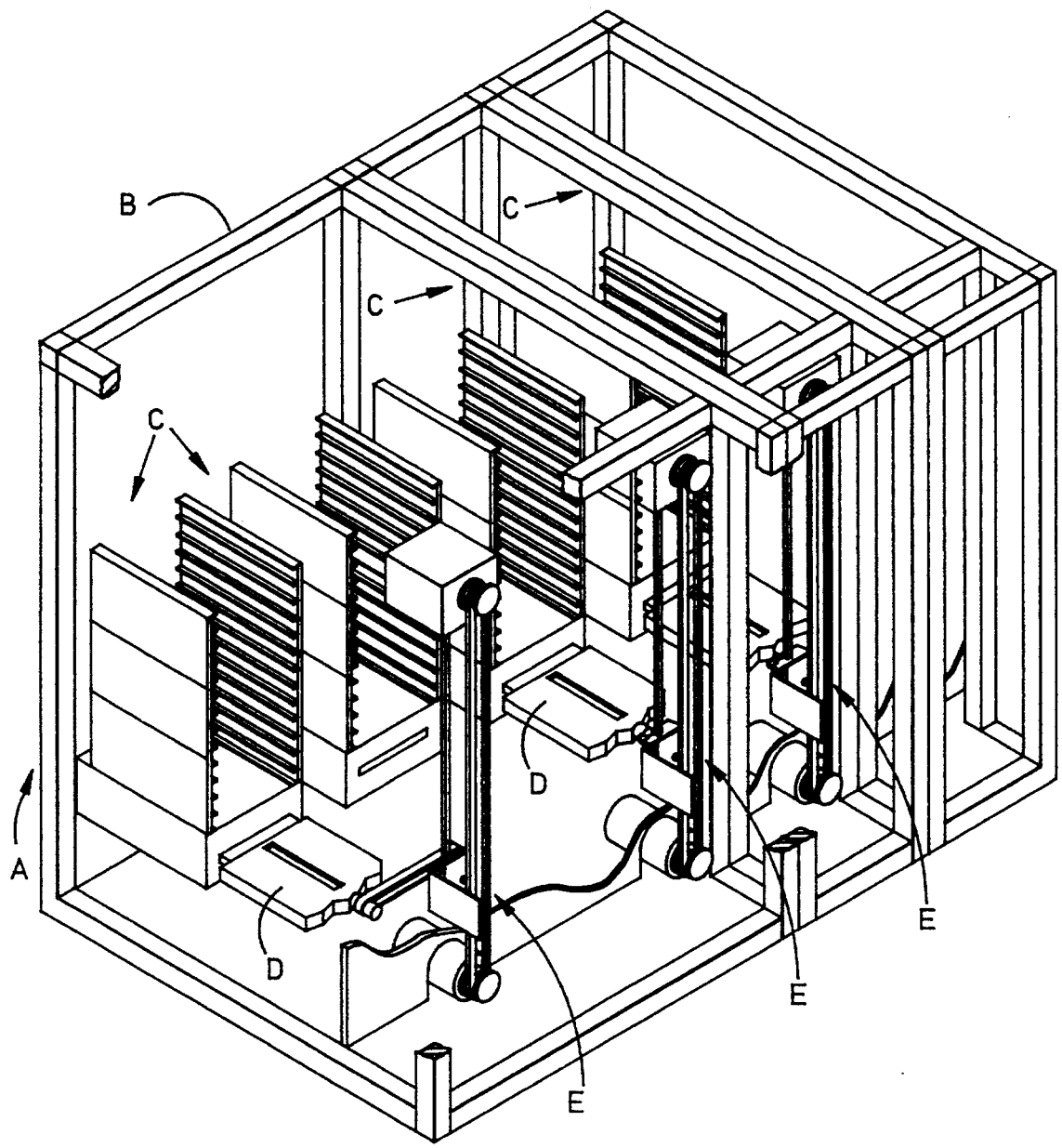
FIG. 1 is a perspective view showing the general construction of an automated data storage library.

Referring now to FIG. 1, a data storage library A illustrates a general configuration and construction which may be used to implement preferred embodiments of the present invention. The data storage library A includes a frame or housing B that supports a plurality of storage cell magazines C. The storage cell magazines C are formed as vertical columns of storage cells that are configured to hold storage media cartridges (containing, e.g., optical disks) therein. The storage cell magazines C preferably also include a peripheral read/write storage device (e.g., an optical disk drive) positioned below the storage cells. The peripheral storage devices are connected for communication with one or more host data processing systems (not shown). The storage cell magazines C are accessed by picker mechanisms D that are mounted on vertical drive mechanisms E. The picker mechanisms D are vertically positionable and include controllable grippers to selectively retrieve and transport storage media cartridges between the storage cells.

The data storage library A could be formed in a variety of sizes and configurations. It might be the size of a personal computer, or could be much larger depending on user requirements. It could also be modular in nature so that plural data storage libraries could be physically combined for sharing storage media cartridges therebetween. The storage media cartridges could be of any conventional type including magnetic tape cassettes for serial access archive purposes, or optical disk cartridges for direct access storage applications. It will be understood that the data storage library A could be used with a variety of data processing host devices including stand-alone and networked personal computers, work stations, mid-range computer systems and main frame systems.

Figure 2:
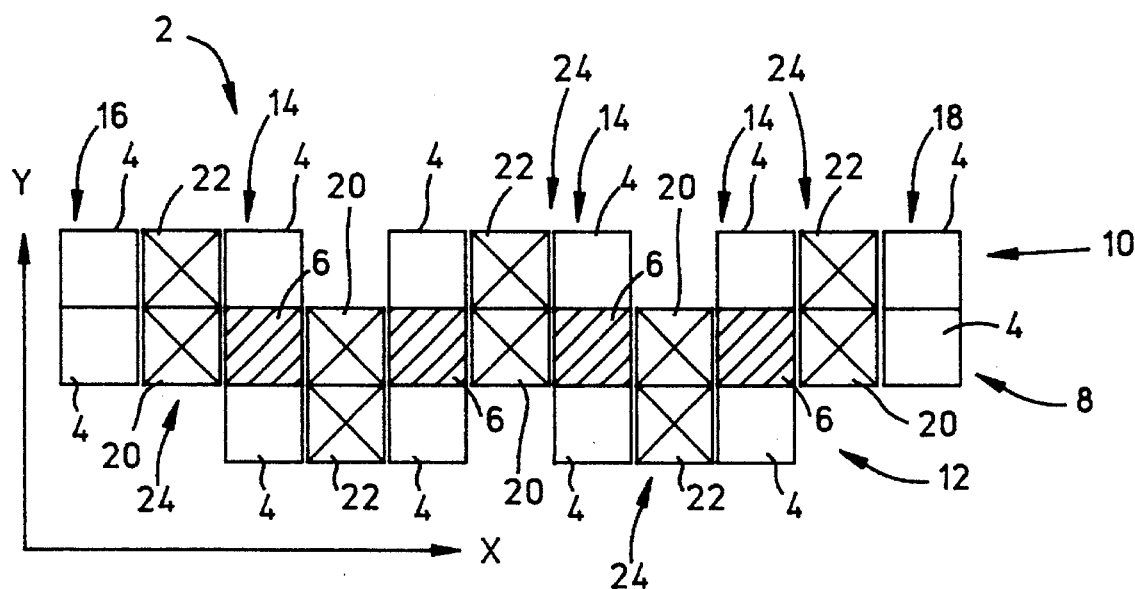
FIG. 2 is a plan view of an automated data storage library constructed in accordance with the present invention.

Referring now to FIG. 2, a data storage library 2 constructed in accordance with the present invention is adapted for mounting in a storage library frame or housing such as that shown in FIG. 1. The data storage library 2 includes plural storage cell magazines 4 and 6 formed as vertical columns of storage cells stacked in the "z" axis direction of FIG. 2. The storage cells of each storage cell magazine 4 are configured for retaining storage media cartridges therein. Some of the storage cell magazines, designated by reference number 6 in FIG. 2, could possess high performance capability or could hold peripheral storage (i.e., read/write) devices in communication with one or more host data processing systems. The peripheral storage devices can thus be conveniently positioned for receiving storage media cartridges from other storage cell locations and for readily accessing the data therein.

The storage cell magazines 4 and 6 are arranged in three rows extending in the "x" direction of FIG. 2, including a central row 8 containing the storage cell magazines 6, and first and second lateral rows 10 and 12, respectively, arranged on each side of the central row 8 and containing the storage cell magazines 4. The storage cell magazines may also be thought of as being arranged in adjacent columns 14 of three magazines each, together with two end columns 16 and 18 of two magazines each.

A plurality of cartridge pickers 20 are positioned along the central magazine row 8 between each successive pair of storage cell magazines 6 of the central magazine row. Similarly, a plurality of cartridge pickers 22 are positioned along each of the lateral magazine rows 10 and 12 between alternating pairs of storage cell magazines 4 of the lateral magazine rows. The cartridge pickers 20 and 22 have grippers for accessing the storage cells of the storage cell magazines 4 and 6 and transporting storage media cartridges therebetween.

Preferably, the cartridge pickers 20 and 22 are arranged in pairs to form double gripper picker mechanisms 24 positioned to access opposing sets of storage cell magazines in the central row and one of the lateral rows. Each picker mechanism 24 is configured to access storage cells on either side thereof in the "x" direction of FIG. 2. Each picker mechanism 24 is also mounted for engagement with a vertical drive mechanism for selective positioning in the "z" direction of FIG. 2. In that configuration, each picker mechanism 24 will have access to two central storage cell magazines (one on each side) and two lateral storage cell magazines (except at the end columns 16 and 18) for each storage cell level in the "z" direction of FIG. 2. The picker mechanisms 24 will always access the central storage cell magazines 6 and alternatingly access each side of the lateral storage cell magazines 4. Viewed in a different way, each central storage cell magazine 6 having high performance capability or containing a peripheral storage device will be accessed by two picker mechanisms (one on each side), while the lateral storage cell magazines 4 will be accessed by a single picker mechanism. Advantageously, there is no requirement for expensive transverse mechanisms. The picker mechanisms need only be vertically positionable.

Figure 3:
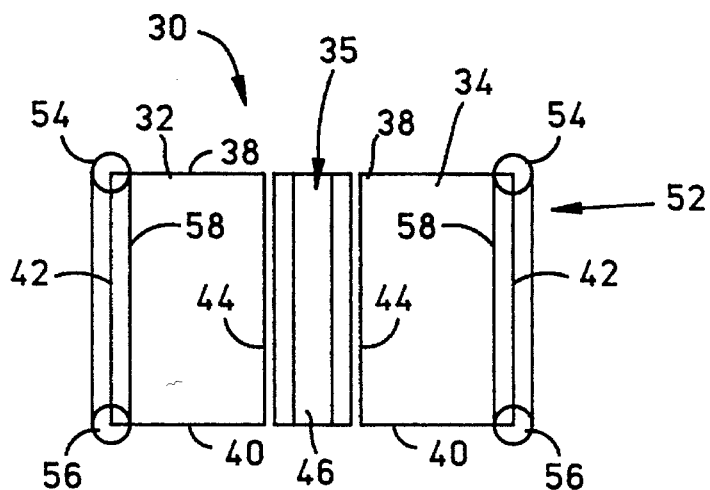
FIG. 3 is a plan view of a double gripper picker mechanism which may be used in the data storage library of FIG. 2.
Figure 4:
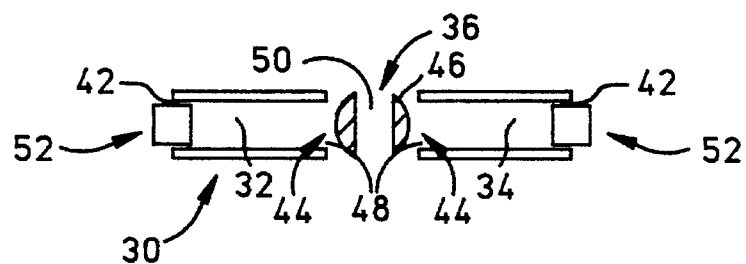
FIG. 4 is a side elevation view of the double gripper picker mechanism of FIG. 3.
Figure 5:
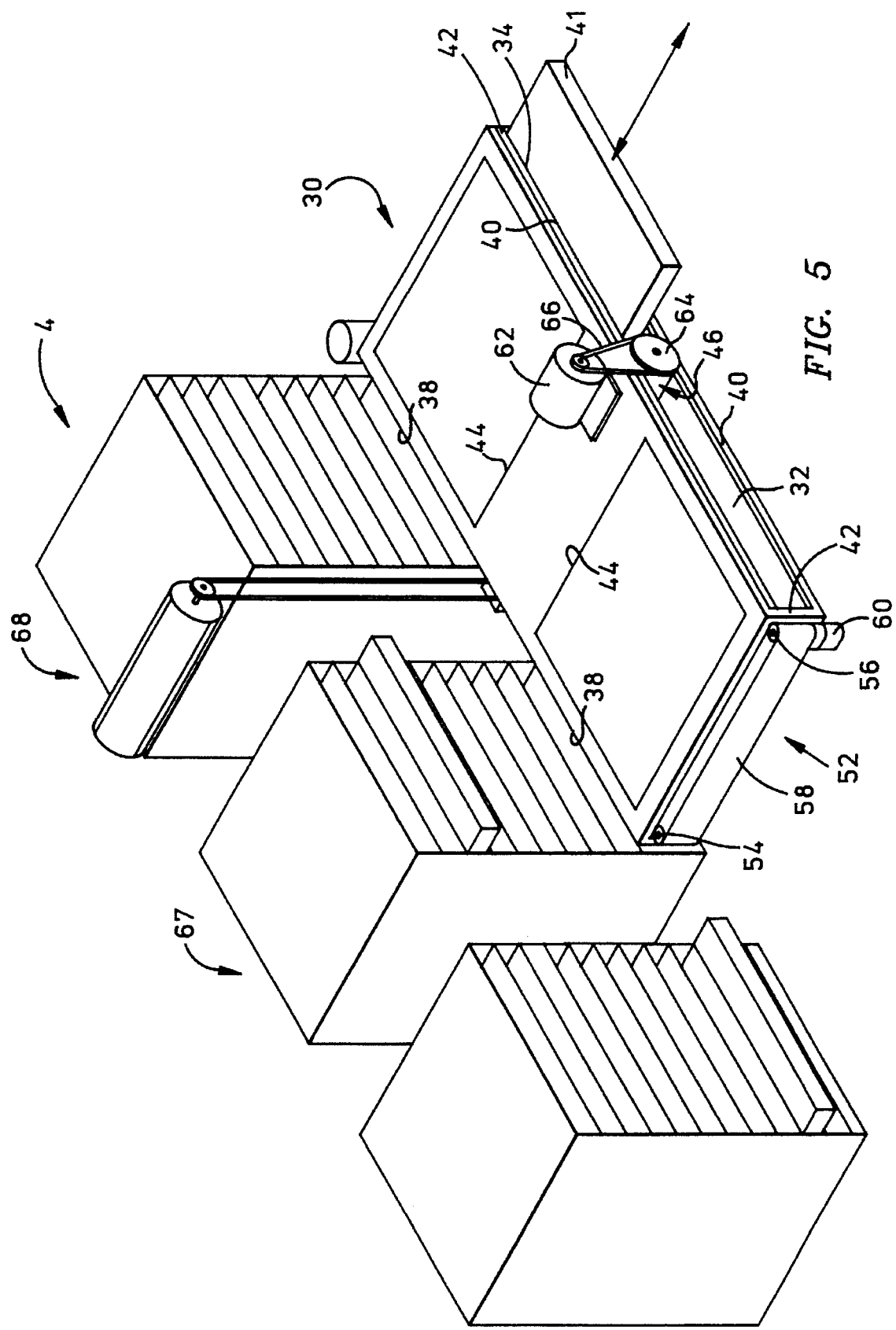
FIG. 5 is a perspective view of the double gripper picker mechanism of FIG. 3 as used in the automated data storage library of FIG. 2.
Figure 6:
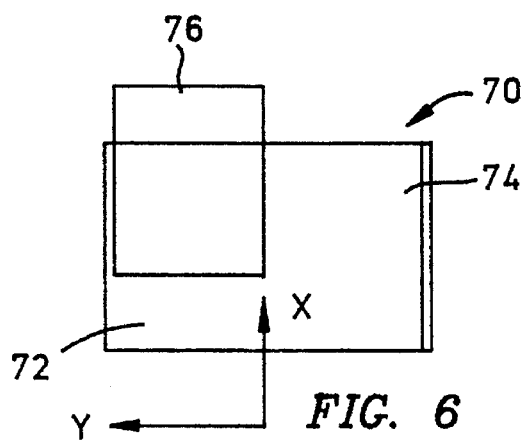
FIG. 6 is a diagrammatic plan view of the double gripper picker mechanism of FIG. 3.
Figure 7A:
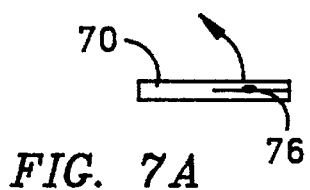
FIGS. 7A, 7B and 7C illustrate one of the cartridge positioning operations which may be performed by the double gripper picker mechanism of FIG. 6.
Figure 8A:
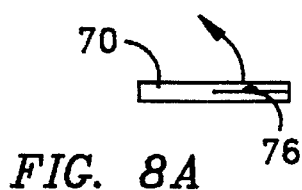
FIGS. 8A, 8B and 8C illustrate another of the cartridge positioning operations which may be performed by the double gripper picker mechanism of FIG. 6.
Figure 7B:
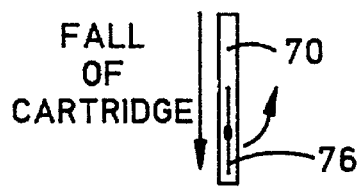
Figure 8B:
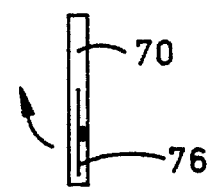
Figure 7C:
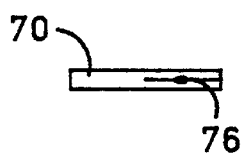
Figure 8C:
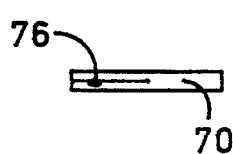

Referring now to FIGS. 3–5, each of the picker mechanisms 24 may be configured as a pass-through double gripper picker mechanism 30. The pass-through double gripper picker mechanism 30 includes a pair of adjacent cartridge chambers 32 and 34 and a cartridge transfer passage 36 therebetween. The cartridge chambers 32 and 34 have first and second ends 38 and 40 which are open for receiving and dispensing storage cartridges 41. The cartridge chambers 32 and 34 further include outer and inner sides 42 and 44 extending between the first and second ends 38 and 40. The cartridge transfer passage 36 is positioned between the inner sides 44 of the cartridge chambers 32 and 34.

More specifically, the cartridge transfer passage of the double gripper picker mechanism 30 is formed in a central hub 46 extending between and generally parallel to the cartridge chamber inner sides 44. The cartridge chambers 32 and 34 are mounted for rotation around the hub 46. The transfer passage 36 is formed by an opening 48 in each of the cartridge inner sides 44 and a slot 50 extending through the hub 46. The openings 48 in the inner cartridge sides 44 are alignable with the hub slot 50 to transfer the cartridge 41 between the cartridge chambers 32 and 34.

The double gripper picker mechanism 30 further includes a pair of roller-driven belt grippers 52 mounted along the chamber outer sides 42. The belt grippers are formed from a pair of rollers 54 and 56 and a belt 58. One or both of the rollers 54 and 56 are connected to a drive source (e.g., an electric motor) 60 for activating the belt 58 for transferring cartridges through the first and second cartridge ends 38 and 40.

The double gripper picker mechanism 30 is powered for rotation about the hub 46 by a drive source (e.g., an electric motor) 62 connected to a pulley 64 mounted on the hub 46 via a drive belt 66. The power source 62 is mounted to the double gripper picker mechanism 30 and rotates with the mechanism as it applies power to the pulley 64. A vertical drive system 68 including a drive motor and a belt driven power train are also provided for vertically positioning the double gripper picker mechanism between storage cell locations.

Figure 9A:
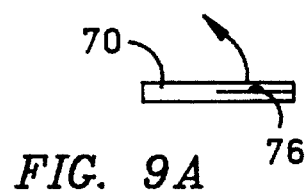
FIGS. 9A, 9B and 9C illustrate another of the cartridge positioning operations which may be performed by the double gripper picker mechanism of FIG. 6.
Figure 9B:
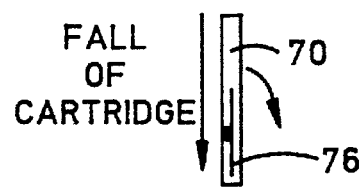
Figure 9C:
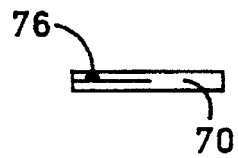

Referring now to FIGS. 6–9C, a pass through double gripper picker mechanism 70 is constructed in accordance with the picker mechanism 30 of FIGS. 3–5. The picker mechanism includes a pair of chambers 72 and 74 that are sized and configured to hold a storage cartridge 76. The picker mechanism 70 is mounted for rotation about its hub, which is aligned with the "x" axis of FIG. 6 (which corresponds to the "x" axis of FIG. 2). The cartridge 76 can be positioned in three ways using the picker mechanism 70. FIGS. 7A–C illustrate an operation that flips the cartridge 76 without lateral repositioning. This operation is executed by rotating the picker mechanism 180 degrees in the counterclockwise direction from the position of FIG. 7A. FIGS. 8A–C illustrate an operation that flips the cartridge 76 and shifts the cartridge lateral position. This operation is executed by rotating the picker mechanism 180 degrees in the clockwise direction from the position of FIG. 8A. FIGS. 9A–C illustrate an operation that shifts the cartridge 76 lateral position without flipping. This operation is executed by rotating the picker mechanism 90 degrees in the counterclockwise direction to the position of FIG. 9B, and thereafter rotating the picker mechanism 90 degrees in the clockwise direction to the position of FIG. 9C. In FIGS. 7B and 8B the cartridge 76 falls due to gravity from one chamber to an adjacent chamber of the picker mechanism as shown by the arrows.

Accordingly, an extendable data storage library utilizing a double gripper picker mechanism has been described. While various embodiments have been disclosed, it should be apparent that many variations and alternative embodiments would be apparent to those skilled in the art in view of the teachings herein. It is understood, therefore, that the invention is not to be in any way limited except in accordance with the spirit of the appended claims and their equivalents.

I claim:

1. An automated data storage library, comprising:

a plurality of storage cell magazines formed from a plurality of storage cells for holding storage media cartridges therein, each magazine having a vertical orientation with storage cells thereof capable of holding the storage media cartridges in a vertical stack;

said storage cell magazines being arranged in three rows of magazines as seen in a horizontal plane including a central magazine row and a pair of lateral magazine rows arranged on first and second sides of said central magazine row;

a plurality of double cartridge pickers wherein each double cartridge picker comprises:

a first cartridge picker and a second cartridge picker, each of the first and second cartridge pickers including a cartridge chamber and a gripper located therein; and the cartridge chambers of the first and second cartridge pickers being joined at a common axis for accessing along a common plane and being in communication with respect to one another along said common plane so that a cartridge will be passed by gravity between the cartridge chambers of the first and second cartridge pickers when the common plane is vertically oriented;

a plurality of the first cartridge pickers positioned along said central magazine row between each successive pair of storage cell magazines of said central magazine row, each first cartridge picker being capable of accessing the storage cells of each storage cell magazine in a respective successive pair of storage cell magazines and for transporting storage media cartridges therebetween;

a plurality of the second cartridge pickers positioned along said lateral magazine rows between alternating pairs of storage cell magazines of said lateral magazine rows, each second cartridge picker being capable of accessing the storage cells of each storage cell magazine in a respective alternating pair of storage cell magazines and for transporting storage media cartridges therebetween; and means supporting each double cartridge picker for rotation about its common axis so that its common plane can alternately rotate 90° to translate one of the storage media cartridges between its cartridge chambers and rotate 180° from a first horizontal position to a second horizontal position to invert said storage media cartridge.

2. The automated data storage library of claim 1 wherein each double cartridge picker includes a cartridge transfer passage between its respective cartridge chambers for causing said communication therebetween.

3. The automated data storage library of claim 2 wherein said cartridge chambers have first and second ends for receiving and dispensing storage cartridges and inner and outer sides extending between said first and second ends, said cartridge transfer passage being positioned between the inner sides of said cartridge chambers.

4. An automated data storage library, comprising:

a plurality of storage cell magazines formed from a plurality of storage cells for holding storage media cartridges therein:

said storage cell magazines being arranged in three rows including a central magazine row and a pair of lateral magazine rows arranged on first and second sides of said central magazine row;

said storage cell magazines including one or more storage cells containing peripheral storage devices adapted to read and/or write data on said storage media cartridges;

a plurality of first cartridge pickers positioned along said central magazine row between each successive pair of storage cell magazines of said central magazine row, each picker having a gripper for accessing the storage cells of said storage cell magazines and transporting storage media cartridges between a respective pair of storage cell magazines;

a plurality of second cartridge pickers positioned along said lateral magazine rows between alternating pairs of storage cell magazines of said lateral magazine rows, each picker having a gripper for accessing the storage cells of said storage cell magazines and transporting storage media cartridges between a respective alternating pair of storage cell magazines;

each of the first and second cartridge pickers having a respective cartridge chamber;

each first cartridge picker being joined along a common axis to a respective second cartridge picker to form a cartridge picker pair with their cartridge chambers in communication with one another along a common plane; and means supporting each cartridge picker pair for rotation about said common axis so that said common plane of the cartridge picker pair can alternately rotate 90° from a horizontal position to a vertical position to translate one of the storage media cartridges from one cartridge chamber to the other cartridge chamber and 180° from a first horizontal position to a second horizontal position to invert said storage media cartridge.

5. A data storage library comprising:

a plurality of magazines, each magazine having a plurality of vertically oriented storage cells for holding storage media cartridges in a vertical stack;

the magazines being arranged in first, second and third rows as seen in a horizontal plane, the second row being sandwiched between the first and third rows;

successive magazines in each row being spaced from one another so that a plurality of lateral passageways extend transverse the rows of magazines;

a plurality of double cartridge pickers, each double cartridge picker having first and second cartridge pickers and each of the first and second cartridge pickers having a chamber which is open at opposite ends for passthrough access between the magazines and having an inner side, the inner sides of the cartridge pickers of each double cartridge picker being open and the chambers of each of the double cartridge pickers being horizontally aligned so that passthrough access exists between the chambers of the cartridge pickers of each double cartridge picker;

rotating means rotatably mounting each double cartridge picker in a respective lateral passageway about an axis which is fixed for movement only in a vertical plane for rotating each of the first and second cartridge pickers of each double cartridge picker for accessing successive magazines in the second row of magazines and for accessing successive magazines in one of the first and third rows; and successive double cartridge pickers accessing alternating successive magazines in the first and third rows.

6. A data storage library as claimed in claim 5 including:

each of the chambers of the double cartridge picker having an outer side; and a roller driven belt gripper mounted along each outer side for transporting said cartridges through a respective chamber and out either end of the chamber.

7. A data storage library as claimed in claim 5 including:

vertical moving means for moving each double cartridge picker vertically along a respective vertical axis; and said rotating means being connected to the vertical moving means for rotating a respective double cartridge picker about a horizontal axis which is substantially perpendicular to said vertical axis.

8. A data storage library as claimed in claim 7 wherein said rotating means includes:

a hub which is fixed with respect to the magazines;

means for rotating a respective double cartridge picker about the fixed hub; and the hub having a vertically oriented horizontally extending slot therethrough which provides a passageway for a cartridge between the chambers of the double cartridge picker, whereby upon rotating the double cartridge picker said cartridge will fall by gravity from a top chamber to a bottom chamber when the double cartridge picker is rotated to a vertical orientation.

9. A data storage library as claimed in claim 8 including:

each of the chambers of the double cartridge picker having an outer side; and a roller driven belt gripper mounted along each outer side for transporting said cartridges through a respective chamber and out either end of the chamber.

10. A data storage library comprising:

a plurality of magazines, each magazine having a plurality of vertically oriented storage cells for holding storage media cartridges in a vertical stack;

the magazines being arranged in first, second and third rows as seen in a horizontal plane, the second row being sandwiched between the first and third rows;

successive magazines in each row being spaced from one another so thin a plurality of lateral passageways extend transverse the rows of magazines;

a plurality of double cartridge pickers, each double cartridge picker including:

a pair of cartridge pickers;

each cartridge picker including a chamber which has first and second open ends for accessing cartridges and inner and outer sides; and said pair of cartridge pickers being joined with their chambers lying in a common plane and each of their inner sides being open so that a cartridge can pass from the chamber of one cartridge picker to the chamber of the other cartridge picker and vice versa by the force of gravity when the common plane of said pair of cartridge pickers is vertically oriented;

rotating means rotatably mounting each double cartridge picker in a respective lateral passageway about an axis which is fixed for movement only in a vertical plane for rotating each of the first and second cartridge pickers of each pair of cartridge pickers for accessing successive magazines in the second row of magazines and for accessing successive magazines in one of the first and third rows; and successive double cartridge pickers accessing alternating successive magazines in the first and third rows.

11. A data storage library as claimed in claim 10 wherein each double cartridge picker includes:

the pair of cartridge pickers being rotatably mounted on a hub for rotation therearound; and the hub having an elongated slot which extends parallel to said inner and outer sides so that when the pair of cartridge pickers are rotated about the hub the slot will open to both of the chambers for allowing a cartridge to fall from one chamber to the other chamber through said slot.

12. A data storage library as claimed in claim 10 wherein each double cartridge picker includes:

a roller driven belt gripper mounted along the outer side of each cartridge picker for transporting said cartridges through a respective chamber and out either end of the chamber.

13. A data storage library as claimed in claim 10 including:

vertical moving means for moving each double cartridge picker vertically along a respective vertical axis; and said rotating means being connected to the vertical moving means for rotating a respective double cartridge picker about a horizontal axis which is substantially perpendicular to said vertical axis.

14. A data storage library as claimed in claim 13 wherein each double cartridge picker includes:

the pair of cartridge pickers being rotatably mounted on a hub for rotation therearound; and the hub having an elongated slot which extends parallel to said inner and outer sides so that when the pair of cartridge pickers are rotated about the hub the slot will open to both of the chambers for allowing a cartridge to fall from one chamber to the other chamber through said slot.

15. A data storage library as claimed in claim 14 wherein each double cartridge picker includes:

a roller driven belt gripper mounted along the outer side of each cartridge picker for transporting said cartridges through a respective chamber and out either end of the chamber.

16. An automated data storage library, comprising:

a plurality of storage cell magazines formed from a plurality of storage cells for holding storage media cartridges therein, each magazine having a vertical orientation with storage cells thereof capable of holding the storage media cartridges in a vertical stack;

said storage cell magazines being arranged in three rows of magazines as seen in a horizontal plane including a central magazine row and a pair of lateral magazine rows arranged on first and second sides of said central magazine row;

a plurality of double cartridge pickers including:

a plurality of first cartridge pickers positioned along said central magazine row between each successive pair of storage cell magazines of said central magazine row, each picker having a gripper and a cartridge chamber for accessing the storage cells of each storage cell magazine in a respective successive pair of storage cell magazines and for transporting storage media cartridges therebetween;

a plurality of second cartridge pickers positioned along said lateral magazine rows between alternating pairs of storage cell magazines of said lateral magazine rows, each picker having a gripper and a cartridge chamber for accessing the storage cells of each storage cell magazine in a respective alternating pair of storage cell magazines and for transporting storage media cartridges therebetween: and each double cartridge picker including:

one of the first cartridge pickers and one of the second cartridge pickers arranged with their cartridge chambers adjacent one another and having a cartridge transfer passage therebetween;

said cartridge chambers having first and second ends for receiving and dispensing storage cartridges and inner and outer sides extending between said first and second ends, said cartridge transfer passage being positioned between the inner sides of said cartridge chambers; and a fixed central hub extending between and generally parallel to said cartridge chambers' inner sides, said cartridge chambers being mounted for rotation about said hub, and said transfer passage being formed from an opening in each of said cartridge chamber's inner side and a slot extending through said hub, the openings in said inner sides being alignable with said hub slot to transfer a cartridge between said cartridge chambers.

17. The automated data storage library of claim 16 wherein each double cartridge picker further includes a pair of roller-driven belt grippers mounted along said chamber outer sides for transferring cartridges through said first and second cartridge ends.

18. The automated data storage library of claim 17 wherein each double cartridge picker is pivotally controllable to flip said storage media cartridges.

19. The automated data storage library of claim 17 wherein each double cartridge picker is pivotally controllable to shift said storage media cartridges between said cartridge chambers.

20. The automated data storage library of claim 17 wherein each double cartridge picker is pivotally controllable to flip and shift said storage media cartridges between said cartridge chambers.

21. An automated data storage library, comprising:

a plurality of storage cell magazines formed from a plurality of storage cells for holding storage media cartridges therein;

a plurality of pass-through double gripper pickers positioned adjacent said storage cell magazines for accessing the storage cells thereof and transporting storage media cartridges therebetween wherein each double gripper picker is rotatable about a respective axis and configured to :flip or translate said storage media cartridges relative to said storage cell magazines; and each double gripper picker including:

a pair of adjacent cartridge chambers and a cartridge transfer passage therebetween;

each cartridge chamber having first and second ends for receiving and dispensing said storage cartridges and inner and outer sides extending between said first and second ends, said cartridge transfer passage being positioned between the inner sides of said pair of cartridge chambers; and a central hub extending between and generally parallel to the cartridge chambers' inner sides, said cartridge chambers being mounted for :rotation around said hub, and said transfer passage being formed from an opening in each of said inner sides and a slot extending through said hub, said openings in said inner sides of the cartridge chambers being alignable with said hub slot to transfer a cartridge between said cartridge chambers.

22. The automated data storage library of claim 21 wherein each double gripper picker further includes a pair of roller-driven belt grippers mounted along said outer sides of the cartridge chambers for transferring cartridges through said first and second cartridge ends.

23. The automated data storage library of claim 22 wherein each double gripper picker is pivotally controllable to flip said storage media cartridges.

24. The automated data storage library of claim 22 wherein each double gripper picker is pivotally controllable to shift said storage media cartridges between said cartridge chambers.

25. The automated data storage library of claim 22 wherein each double gripper picker is pivotally controllable to flip and shift said storage media cartridges between said cartridge chambers.

26. A double cartridge picker comprising:

a pair of cartridge pickers;

each cartridge picker including a chamber which has first and second open ends for accessing cartridges and inner and outer sides; and said pair of cartridge pickers being joined with accessing directions of their chambers lying in a common plane and each of their inner sides being open so that a cartridge will pass from the chamber of one cartridge picker to the chamber of the other cartridge picker and vice versa by the force of gravity when the common plane of the chambers of said pair of cartridge pickers is vertically oriented;

a roller driven belt gripper mounted along the outer side of each cartridge picker for transporting said cartridges through a respective chamber and out either end of the chamber;

the pair of cartridge pickers being rotatably mounted on a hub for rotation therearound; and the hub having an elongated slot which extends parallel to said inner and outer sides so that when the pair of cartridge pickers are rotated about the hub the slot will open to both of the chambers for allowing a cartridge to fall from one chamber to the other chamber through said slot.

27. A double cartridge picker as claimed in claim 26 including:

a roller driven belt gripper mounted along the outer side of each cartridge picker for transporting said cartridges through a respective chamber and out either end of the chamber.

28. An automated data storage library, comprising:

a plurality of storage cell magazines formed from a plurality of storage cells for holding storage media cartridges therein;

a plurality of pass-through double gripper pickers positioned adjacent said storage cell magazines for accessing the storage cells thereof and transporting storage media cartridges therebetween wherein each double gripper picker is rotatable about a respective axis; and each double gripper picker including:

a pair of cartridge chambers located on each side of said respective axis;

said pair of cartridge chambers being in communication with one another along a common plane so as to provide a passageway therebetween for one of the storage media cartridges; and each chamber having first and second ends for receiving and dispensing said storage media cartridge and inner and outer sides extending between the first and second ends, said passageway being positioned between the inner sides of said pair of cartridge chambers; and means for rotating the double gripper picker 180° and/or 90° about said respective axis so that the storage media cartridge can be flipped and/or translated.

29. A double cartridge picker comprising:

a pair of cartridge pickers;

each cartridge picker including a chamber which has first and second open ends for accessing cartridges and inner and outer sides;

said pair of cartridge pickers being joined with their chambers lying in a common plane and each of their inner sides being open so that a cartridge can pass from the chamber of one cartridge picker to the chamber of the other cartridge picker and vice versa by the fall of gravity;

the pair of cartridge pickers being rotatably mounted on a hub for rotation therearound; and the hub having an elongated slot which extends parallel to said inner and outer sides so that when the pair of cartridge pickers are rotated about the hub the slot will open to both of the chambers for allowing a cartridge to fall from one chamber to the other chamber through said slot.

30. A double cartridge picker as claimed in claim 29 including:

a roller driven belt gripper mounted along the outer side of each cartridge picker for transporting said cartridges through a respective chamber and out either end of the chamber.

* * * * *

UNITED STATES PATENT AND TRADEMARK OFFICE
CERTIFICATE OF CORRECTION

PATENT NO. : 5,610,882
DATED : March 11, 1997
INVENTOR(S) : Dang

It is certified that error appears in the above-indentified patent and that said Letters Patent is hereby corrected as shown below:

Column 7, line 49, change "thin" to --that--.

Signed and Sealed this

Twenty-fourth Day of February, 1998

*Attest:*

BRUCE LEHMAN

*Attesting Officer*          *Commissioner of Patents and Trademarks*